United States Patent [19]

Stewart

[11] 4,202,155
[45] May 13, 1980

[54] AQUATIC WEED CUTTER, DE-ROOTER AND HARVESTER

[76] Inventor: Errol G. Stewart, 14 Wood St., Rockland, Ontario, Canada

[21] Appl. No.: 921,560

[22] Filed: Jul. 3, 1978

[30] Foreign Application Priority Data

Jul. 26, 1977 [CA] Canada ................................. 282509

[51] Int. Cl.² ............................................. A01D 44/00
[52] U.S. Cl. .................................................. 56/9; 37/63
[58] Field of Search ..................... 56/8, 9; 37/78, 62, 37/63, 54

[56] References Cited

U.S. PATENT DOCUMENTS

| | | | |
|---|---|---|---|
| 418,000 | 12/1889 | Fletcher | 37/78 |
| 1,344,626 | 6/1920 | Ellis | 56/9 |
| 2,429,044 | 10/1940 | Bassett | 171/64 |
| 3,295,231 | 1/1967 | Talbott | 56/8 |
| 3,402,487 | 9/1968 | Vaughan et al. | 37/78 |
| 3,407,577 | 10/1908 | Fiske | 56/8 |
| 3,477,213 | 11/1969 | Just et al. | 56/9 |
| 3,596,444 | 8/1971 | Beattie | 56/9 |
| 3,599,354 | 8/1971 | Larson | 56/8 |
| 3,765,156 | 10/1973 | Porter | 56/8 |
| 4,070,978 | 1/1978 | Virgilio | 37/71 |

Primary Examiner—Russell R. Kinsey
Assistant Examiner—Paul J. Hirsch

[57] ABSTRACT

Apparatus for cutting, de-rooting and harvesting of aquatic weed growth is disclosed. The apparatus is of modular construction for ease of land transportation and includes a cutting and de-rooting head assembly which is carried by extensible framing for proper positioning on the bed of a river or lake. The head assembly has weed severing means and scrubbing, polishing means in the form of vortex generators and may include lake bed scarifying means to assist in de-rooting weed growth. Cut weeds and weed fragments are contained in a vertically extensible curtain containment chamber from which they are loaded into a trailing hopper.

11 Claims, 6 Drawing Figures

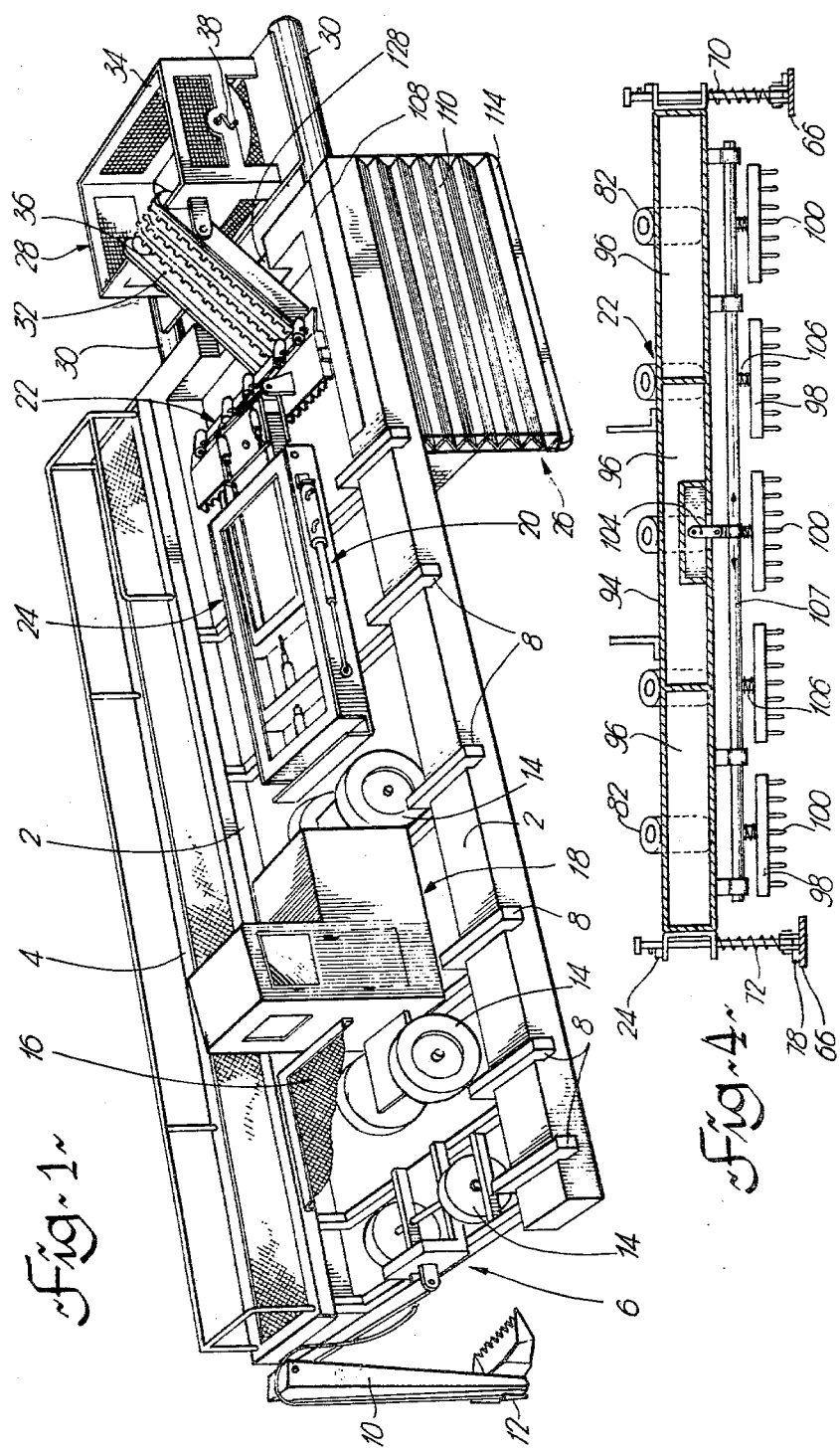

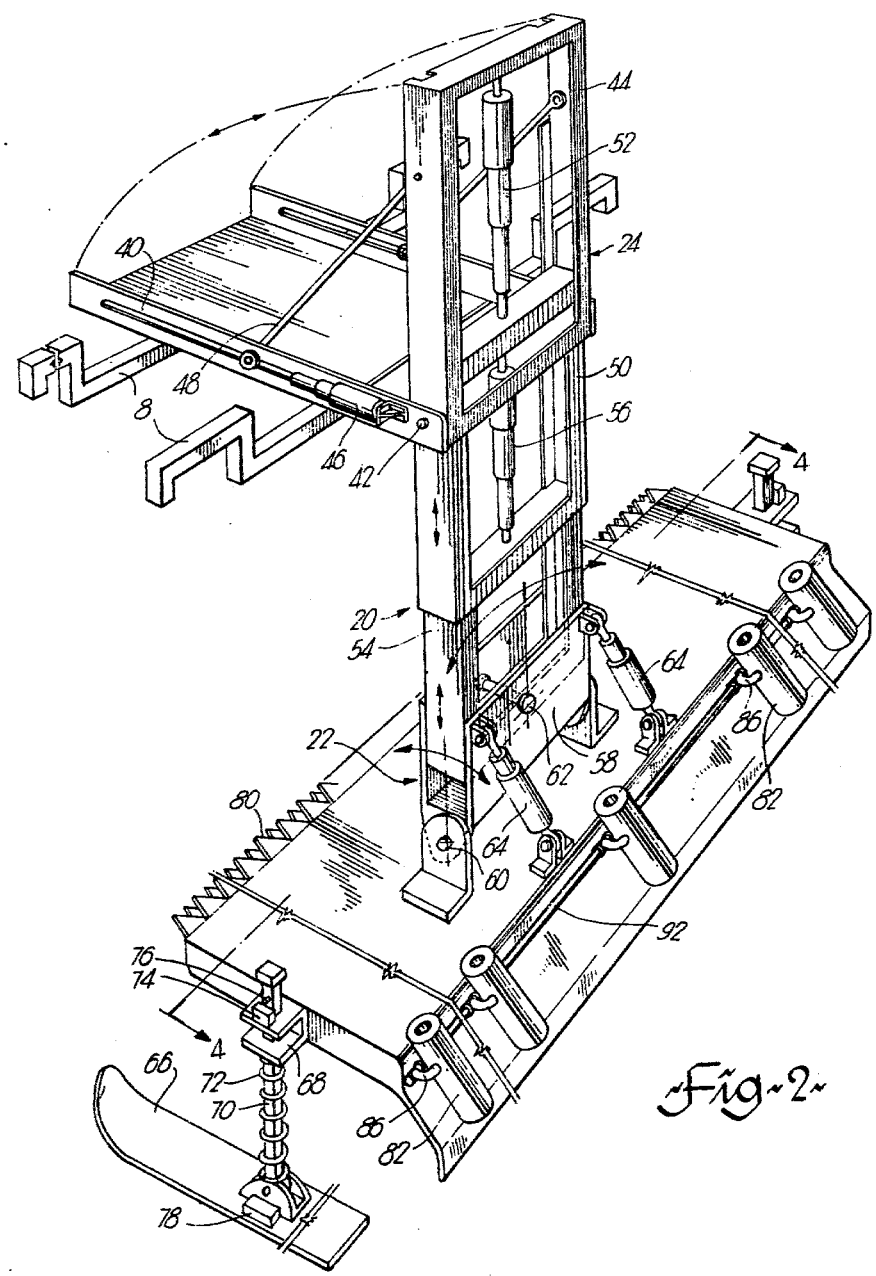

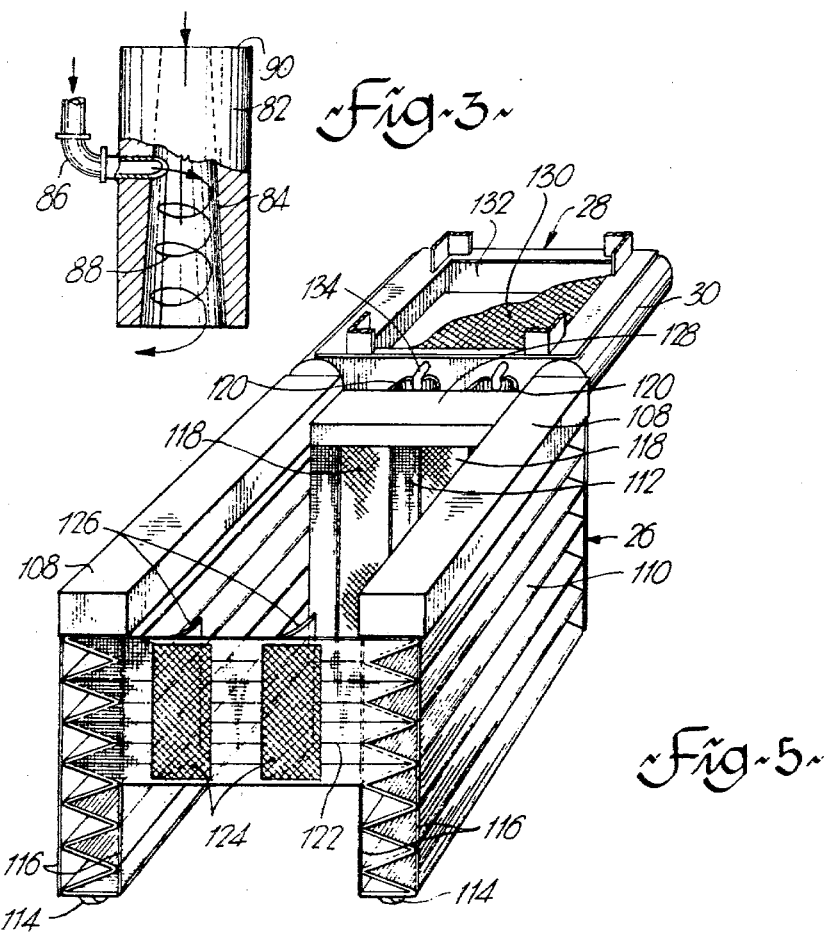
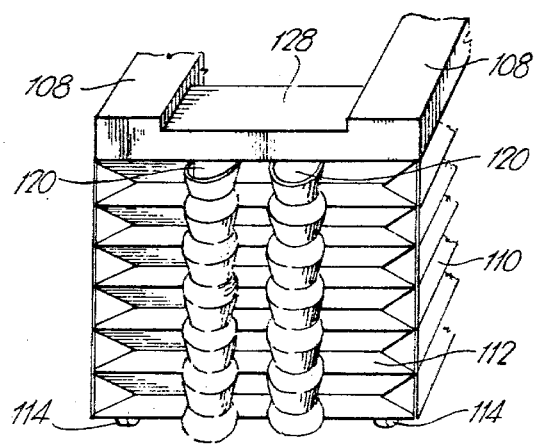

AQUATIC WEED CUTTER, DE-ROOTER AND HARVESTER

DISCUSSION OF PRIOR ART

Presently used devices which are designed for aquatic weed and root removal encourage the spread of weed and root fragments, stimulate weed growth, and have difficulty operating in rocky substrates, around obstacles and in confined spaces. They are difficult to transport, cannot operate at a sufficient water depth and are not effective against tall or floating weed masses.

The known devices are susceptible to storms, cannot follow the lake or river bed contours, do not control turbidity adequately, and cannot monitor work in progress and are susceptible to wear and breakage. They do not provide for drift monitoring and correction. None of the known systems provide for an immediate and thorough kill of the collected weeds, and weed fragment containment is either inefficient or non-existent. Known systems do not sufficiently destroy weed roots and they have much difficulty in controlling working heads below the surface of the water.

OBJECTS OF THE PRESENT INVENTION

The present invention seeks do avoid the problems and disadvantages of prior art structures and the principal object of the invention is to provide apparatus specifically adapted for cutting, de-rooting and harvesting of aquatic weed growth.

A further object of the invention is to provide such apparatus which is of modular construction for ease of land transportation and which carries a cutting and de-rooting assemnbly which is carried by extensible framing for proper depth positioning on the bed of a river or lake.

A further object is to provide such apparatus which has river- or lake-bed scouring and scarifying means to assist in de-rooting weed growth to minimize the possibility of immediate re-growth after cutting.

Still another object is to provide such apparatus which includes weed fragment collection means and to provide for thorough kill of the collected fragments.

DESCRIPTION OF PRESENT INVENTION

The problems of cutting and derooting of aquatic weeds are overcome by the present invention by providing a sequence of working heads consisting of a cutter bar and an array of water vortex generators, and preferably including a derooting assembly, which are mounted on a tilt correcting pressure and position monitored and controlled frame which is supported by a system of continuously variable, sliding tiltable racks. The present system allows the working heads to descend beyond at least twenty-five feet of working depth and permits the working heads to follow the contours of the lake or river bed while providing for monitored protection of the machinery. The present apparatus may also be operated in periods of rampant weed growth while thoroughly clearing roots and stubble to a controlled depth below the mud-water interface.

The problems associated with lifting and controlling a heavy working head section under water at continuously varying depths are overcome by the installation in the head section of a low profile flotation chamber or chambers which may be filled or emptied on demand to achieve a slight negative or positive buoyancy whereby the effective weight of the head frame unit back to the depth control racks is greatly reduced. This allows for much smaller and less expensive depth controlling hydraulic cylinders and control wires.

A further reduction in the size and strength of the depth control cylinders is made possible by a tilt mechanism configuration. When the working head frame is at the surface of the water and the head must be lifted from the water into the storage position, maximum weight is reflected by the head to the lifting mechanisms. In this position, however, the sliding racks are in the vertical position above the centre of gravity. Actuation of the tilt mechanism to the storage position enables the depth control frames to act as a counter-weight and the head unit may thus be levered clear of the water with little effort by the hydraulic cylinders. Further, reductions in depth control hydraulics' size and cost is enabled while enhancing the response time of the assembly, allowing for positive position control and holding of the extension unit at the required depth. This preferably is accomplished by the construction of push-pull swing multipliers which are actuated by inexpensive hydraulic cylinders.

The problems of turbidity, cut weed collection and fragment containment are overcome by providing a retractible containment curtain which envelops the working head and frame extender assemblies and leads the cut weeds and fragments to a collecting beltless conveyor and a spill-over fragment trap. The curtain is prevented from ballooning during operation by the provision of a slatted accordion construction, nylon mesh strips and cross members while damping and containing the turbidity generated by the de-rooting activities and the fragment trap through the provision of semi-cylindrical canvas tubes sewn or positioned over the nylon mesh strips, and by providing a removable sludge tray and return hoses from the fragment trap to the canvas tubes. The curtain allows for work during periods of rampant weed growth to a depth of at least twenty-five feet through the provision of removable front sections while guarding against interference with the heads by providing progressively more rigid leading edges to the curtain box assembly as the work depth is increased. The curtain box automatically follows the contours of the lake or river bed because of its accordioning construction. The fragment containment trap is not affected by the opening of the sections.

The problems of cut weed handling and disposal are resolved by the provision of a trailing component on which is mounted a beltless conveyor, a weed fragment trap and a bearing mounted reticulated container which may be automatically or manually dumped into an extendible sliding chute for disposal on shore or into a collecting barge.

Waste hot water is pumped over the weeds in the tank from the engine manifold, exhaust pipe heat exchanger or an inline water heater which quickly breaks down the weed fibres and kills the weeds and roots while greatly reducing the bulk and springiness of the collected weed masses. This results in fewer trips to shore for disposal, ensures that the collected spoil is dead, increases on line time and eases the problem of handling springy masses of raw weeds. The spoil so destroyed will be a pulpy mass which may be safely slid to shore (or into a collecting barge) via an extendible chute located under the dumping tank.

The problems of working in confined areas and in crevices are overcome first by the use of a backhoe assembly on which is mounted a high pressure, high volume hose and nozzle which terminates at the backhoe bucket and which is fed from a manifold enveloping the main drive propellor on the power module, or by a high capacity pump. Secondly, the working head frame may be rotated one hundred and eighty degrees and the working head extension unit may be extended from the stern and the heads actuated while retracting the extender frames. In this case, the backhoe unit provides positive thrust and steering and anchoring of the machine for optimum position control.

Smaller tilt frames and head assemblies may be provided if the machine's prime function is to work in confined areas.

The problems of working around obstructions are solved by the combined use of the backhoe, its high pressure nozzle, and by tilting the main head frame mount parallel to the extender arms and actuating the vortex generators. The selection of heads and sequences of operation will be determined by the nature of the obstacles and their monitoring.

Problems associated with de-rooting heads negotiating various pits, holes and small obstructions as opposed to the general inclination of the lake bed while de-rooting over a wide continuous swath may be overcome by providing an array of individual scarifying head segments which are caused to oscillate in unison while each separator spring mounted section drops into depressions or rides over small obstructions. The scarifying is accomplished by spring steel or stiff rubber mounted spikes.

The backhoe may be used to clear away boulders and stumps or scrapped debris such as automobiles while the backhoe nozzle, or the main vortex generators may be used to wash weed growth away from the bases and out of crevices on larger rock outcroppings, telephone cables or other obstructions which may not be moved. Monitoring of the bottom conditions and the work in progress may be achieved through the provision of a glass port extending through the floor of the operator's station, through providing a modified aircraft drift monitor or reverse periscope assembly or through commerical depth finding heads mounted on the backhoe and working head frame mounts. Pressure and position sensors on the working head frame mount skis also provide further monitoring of the bottom conditions. Closed circuit television cameras could also be mounted on the working assemblies and backhoe.

The problems of working in severe wind and wave conditions up to twenty-five knots are solved by providing low profile pontoons with water tight chambers, an open steel support framing and walkways, three positive propulsive drive systems which may be independently or simultaneously used and powered drift correction and monitoring. The assembled system is longer and wider than known structures, allowing the craft to balance out most of the shorter wave lengths generated on small bodies of water.

Problems with on line tracking and steering may be overcome through the combined use or individual activation of a lateral drift sensor, a glass port, drift correcting manifold piping and by positioning the weed containment curtains and working head extender units aft where they provide a dragging resistance during work which will keep the craft on line during work periods.

Problems of withstanding gale force winds and wave conditions are solved by the craft's ability to easily pull itself out of the water.

The problems usually associated with land transport and with launching a machine of this size and nature are overcome by its systematization into discreet operational sections or modules which may be quickly dismantled into self-contained wheeled trailers which may be towed by light vehicles to the next sphere of operations.

Reassembly of the system at the next job site is facilitated by the same trailerability, self-locking pins on structural cross members and through the use of the self-containing backhoe and head extender units to lift the pontoons and other hardware into position between the cross members where they are lock pin, slip bolted into position.

Launching is accomplished under its own power through the use of the backhoe as a foot-leg combination.

The slide mount rack framing carrying the working heads is capable of variable tilt from the horizontal to the vertical position. It comprises a main frame of heavy duty structural steel members with mounting brackets on the underside of the frame to contain removable supporting cross members. Wheel mounting assemblies for transport are also located under the main frame. At the front end of the chassis is located a ball socket trailer mount. At the aft end is an array of wire rope pulleys housed in an enclosure formed by the chassis' longitudinal sections and a cover plate. Extending through the pulleys and beyond the sides of the enclosure is a heavy duty shaft, the ends of which act as hinges for the tilting rack support assembly. Mounted on the top outside surface of the chassis frame are located brackets which contain hydraulic cylinder actuators for the tilting rack support. Within the main frame assembly is located a hydraulic swing multiplier actuating assembly for the upper sliding rack section.

The tilting rack support assembly consists of longitudinal support members so fashioned as to form a containing lip for the sliding racks. Extending along the inner surface of the support members are roller bearings along which the upper rack assembly slides. A stop plate is contained in the lower cross brace which limits the extension of the upper sliding rack. When assembled, the sliding mount supporting assembly and main frame is capable of varialbe tilt from its horizontal storage position to the vertical.

Contained by this sliding support rack is a group of racks, each of which slides within the previous one. Their extension is controlled by a hydraulic cylinder swing multiplier assembly. Each rack controls the extension of the rack immediately below it.

The swing multipliers consist of a hydraulic cylinder, the full extension of which is some fraction of the total length of the extender rack. Fastened parallel to the cylinder extending the length of the rack is a slotted guide which contains a sliding bar. This bar in the case of a swing doubler is the length of the full extension of the hydraulic cylinder. The sliding bar contains holes or mounting brackets for wire rope. When the cylinder is actuated for downward extension, wire rope rigging which extends from the upper end of the actuating rack to the upper end of the actuated rack via the lower sliding bar section is forced downward at twice the rate and extension as that of the cylinder. Similarly for upward extension, wire rope rigging extends from the upper end of the actuated rack via the upper sliding bar section to the lower actuating rack.

The extension of each rack with this arrangement occurs at twice the rate and distance as that of the actuating cylinders. The speed of vertical head movement through the water will be increased by two, four and six times when one, two or three sections are being actuated at the same time.

The full extensions of the rack head assembly may be to any reasonable depth, but in the present apparatus an extension of somewhat more than 25' is contemplated. The required distance will be determined by the length and number of racks and the extension multipliers. Angular wire rope bracing, the length and tension of which is adjusted externally by a hydraulic motor, may be provided while working near or at maximum extension.

At the most extreme end of the bottom extender rack is fastened a support frame which holds the working heads, and head actuating assemblies, and the pressure and position monitoring skid assemblies. It is constructed of structural steel or aluminum members to which is attached mounting brackets which hold the cutter bar, de-rooting head and vortex generator or high capacity nozzle array. Flotation chambers are contained within the cross members of the frame and the entire assembly is shrouded from the rear of the weed cutter aft with a cowling.

The frame is position controlled by hydraulic cylinders to correct for the inclination of the lake or river bottom and for manoeuvering around obstructions. The connecting swing mount between the head frame and the extender rack consists of two frames cross-connected at the bottom with a shaft and bearing running through the upper sections of the mount and the lower cross beam of the extender rack. The mount also provides holes or bearings near its bottom extremity through which is extended a connecting shaft which functions as a hinge pin between the working head frame and the swing mount. This arrangement allows the head frame to automatically tilt along a second axis which is perpendicular to those in the head frame correction elements. The entire frame is thus compensated for variable lake bed inclinations running across and along its line of working travel. Springs are installed which bring the head frame back to its normal position perpendicular to the extender rack. Mounting brackets are positioned on the outer frames of the swing mount for the tilt frame cylinders. The hydraulic cylinders are fastened to the support frame with quick release locking pins. Connected between the bottom cross member of the lowest rack and the head support frame is a ball and socket joint. By removing the locking pins from the cylinders and pulling the sliding hinge bolts the entire head support frame may be rotated one hundred and eighty degrees for work in the opposite direction.

The working heads are connected in sequence from forward to aft on the head support frame. An extended version of an agricultural mowing blade is followed by a de-rooting head which is followed by an array of water vortex generators or high capacity nozzles. The cutter bar is used during periods of rampant weed growth by first cutting the weeds near their bases and allowing them to drift into the containment chamber for collection and disposal. The cutter bar may be actuated by a hydraulic motor eccentric arm arrangement. The de-rooting head which immediately follows the cutting bar removes the bulk of the stubble and roots by scarifying the lake or river bottom to a depth of six inches unless working on a gravel or rock base. The loosened and freed stubble and roots drift back into the containment chamber for collection.

The head frame may be designed such that it will accept a wide variety of de-rooting head assemblies. Three of such arrangements will now be briefly described.

A hydraulic motor actuated roller, the same length as the mowing blade, is equipped with alternating arrays of sharpened spring steel tines which extend from the rotor shaft and are mounted around the shaft. The ends of the shaft are bushing mounted and extend through mounting brackets and are fastened in position with washers and cotter pins.

A secondary drive sprocket fastened to the rotor shaft may be used in conjunction with the hydraulic motor if it becomes necessary to alter the speed of rotation.

Secondly, a de-rooting head may be fashioned from segments of steel box beam into which replaceable spring steel prongs or stiff rubber mounted spikes are set through a series of offset holes along the length of box beam. On the top of the box beam segment is a sectional mount consisting of two ribs of metal extending across the width of the box beam segment. On the top of these ribs is welded a box beam segment through which holes have been bored in the centre of the top and bottom plates. Through these holes is extended a shaft of metal which is either welded or fastened with a retaining ring to the mount. Surrounding the shaft is a separator spring. A box beam frame, cut to take any required number of the sections previously described has holes bored through it at intervals on both top and bottom surfaces. The shafts of each of the sections are shoved through the holes with the frame resting on the separator springs. The upper section of the shaft may be fastened with a cotter pin-washer assembly or retaining ring. Along the side of the frame is welded a slide assembly which contains the actuating lever extending to a hydraulic motor and eccentric actuating arm. A simple slide mount for the frame may be fashioned from angle, channel or other suitable material.

Thirdly, an agricultural spring harrow may be adapted for mounting behind the cutter bar where bottom conditions are relatively free of obstructions and production is to be maximized.

An array of water vortex generators or high capacity nozzles is mounted behind the previous two working heads and are fed with water from a manifold hinged to extend over the main drive propeller or from a high capacity water pump in the power hydraulic control module. Each generator is fashioned from a stainless steel tube or other suitable material. The top contains an aperture not greater than one half the diameter of the steel tube and the rim or lip of the aperture is bevelled inward toward the bottom. The water is fed via a pipe no greater than one quarter of the diameter of the generator tube. This pipe extends into the generator tube along the inner wall and angles slightly downward toward the base. The exit aperture of the feeder tube is cut diagonally and the feeder tube is welded into position. These generators cause the water to spin and to pull more water through the aperture in the top plate thus rendering an amplifying effect. They are directed at the previously loosened lake bed where the turbulent water funnel twists and washes out any remaining roots. High capacity commercial nozzles may be used instead of vortex generators.

Damage to the heads caused by excessive pressure exerted by the unit against the water bed is avoided by the provision of single bearing mounted, spring separated skids which are fastened to each end of the working head frame. A shaft or strut(s) extending through separator springs on a bracket mount actuate a reostate (variable resistance) assembly equipped with limit switches and variable sensitivity circuitry to correct for the softness of the lake bed. The output of this sensor is an electrical signal analogous to the degree of head versus bottom pressure as determined by the compression of the spring. The signal is fed to indicator lights which indicate whether there is a state of overpressure or whether the head assembly is not touching bottom. The effect of this monitored control is to limit the depth of cut and to protect the head and extender assembly from excessive pressure by the system.

The tilt extender, position controlled support frame cowling, working heads and skids are a module or discrete unit of the mechanical weed removal process. The unit is depth controlled by the operator or a microprocessor opening hydraulic valves which cause the working heads to descend to the required depth as initially determined from a commercial depth finder. It is variable on demand to a depth greater than twenty-five feet.

Compensation for continuously variable depths and inclinations and bottom surface conditions is provided by a variable resistance circuit which is varied by the skids which ride on the bottom of the lake bed.

The current position of the heads and mounting frame relative to the inclination of the lake bed is analagous to the signal from the lower skid strut mounting assembly which is fed to a negative zero positive metering circuit. The meter indication will be zero when the operator has actuated the head frame tilting hydraulic cylinders until the frame and skids are parallel to each other.

The third use of the skids described above is to provide a running surface for the head frame assembly.

The weed and root products of the cutting, scarifying operations and the local turbidity generated by these activities are contained by containment chamber leading back to a collecting conveyor and a fragment trap. Side curtains of the containment chamber may be mounted on the outside or inside of the port and starboard sections of the pontoons or may be contained within a cavity in the pontoons. Mounting on the outside allows for a wider working head assembly.

The two side curtains are constructed of rot resistant medium weight canvas, egyptian cotton or other material seamed in the horizontal direction at, for example, eighteen inch intervals. Inside each pocket so formed is placed a sixteen inch wide batten of quarter inch chipboard or other suitable material. Eighteen pockets per side will be required to obtain full extension of twenty five feet. The aft curtain contains alternating strips of canvas and nylon mesh screening sewn in the vertical direction with a semi-cylindrical tube sewn over each of the nylon mesh strips. This procedure will help prevent ballooning during operation yet will dampen excess turbidity.

Horizontal support straps at intervals on the aft curtain extend across the entire width of the curtain. The aft ends of the port and starboard curtains extend such that they meet with the aft curtain slats. These are fastened together such that a rectangular accordioning box with an open front end is formed.

Two half curtains each with for example nine pockets, similar to the rear curtain in construction are added to form a continuous box. The lower half curtain is not used during periods of heavy weed growth. This allows the weed mats to enter the chamber for cutting yet traps them in the upper section once they are cut and floating freely. This feature is particularly important when working in deeper water. Both front curtains may be removed when working in water under eight feet in depth.

The lower curtain is added to form a continuous box while working in the off season when weed growth is less rampant. This will provide thorough damping of turbidity as well as fragment containment. Heavy weed growth helps somewhat in keeping turbidity contained during de-rooting operations. The lower curtain is added only when the weed growth is not present and roots and crowns are the predominant crop.

In order to provide a stiff leading edge to the side curtain during its various extensions and to prevent the bunching of the curtain slats during retraction and to eliminate fouling of the working heads by the curtains, strands of elastic cord with a minimum stretch ratio of for example slightly more than three to one are installed through holes or eyelets on the inside and outside of the leading edges of the box at the points where the alternate slats bend. When retracted, the curtain will be approximately two feet in depth and which can extend to twenty-five feet. In order to provide for this extension, each elastic cord must be at least twelve feet in length. The strands extend beyond the upper curtain rail and are wrapped once around the pontoons where they are fastened to the top outside edge on a mounting bracket. Roller or other anti-friction guides may be provided at each outer edge of the pontoons in order that wear on the elastic cords is reduced. The stretching elastic cords provide a progressively stiffer leading edge as the working head and curtains are extended toward their maximum depth.

The open front end of the box extends in advance of the cutting blades. Its extension and retraction are actuated by cross members extending from the working head frame mount and by the tension of the elastic cords.

The bottom edges of the port and starboard curtains will be fastened with a segmented strip of strap iron which will function as running skids and will reduce wear on the bottom of the curtains.

In order to avoid interference of the curtains with the working head, cross bracing from the leading edges of the curtains to the head extender may be necessary,. This bracing will also be useful when the curtains are set in the storage position or are retracted.

A removable nylon mesh floor in the box equipped with dome fasteners or other appropriate devices may be installed when working around precipitous banks verging on deep water. This will ensure the entrapment of all fragments during work on this type of underwater terrain.

Because of the forward motion of the machine and the tendency of the weeds, fragments and root particles to float or remain in suspension due to the action of the vortex generators and the water pumped in externally via the vortex generators, the weeds and fragments are conducted back to the rear of the curtain area for collection by a commercial beltless elevator with eccentrically mounted actuating arms (Cockshutt 3A or equivalent).

When operating in periods other than that of maximum weed growth and roots and crowns are the predominant crop, the curtains will form a continuous box as described above. The pumping of water through the vortex generators and the lack of weed mats will greatly increase the upwelling of turbid water which will spill over into the fragment trap along with the fragments. The turbid water from this spill over is led into the upper sections of the semi-cylindrical canvas tubes mounted over the nylon mesh strips on the aft curtains from a removable sludge tray mounted under the screen mesh basket. When concluding work in an area, there will be fragments remaining in the containment chamber. These can be quickly cleaned out by the machine remaining stationary while water is pumped in via the vortex generators and allowed to spill over into the fragment trap.

The conveyor is mounted on a trailing weed disposal raft and its lower extremity drops over the upper edge of the aft curtain assembly where it is actuated by a hydraulic or electric motor. This configuration will pick up the bulk of the floating weed masses and will lift them from the water to a bearing mounted vat which is capable of being automatically or manually dumped into extendible slide chutes and thence to shore or into barges.

Small fragments and root pieces which are not entrapped by the incoming weed masses will continue to float or remain in suspension until they are either trapped by incoming weed masses or float behind the conveyor and still within the containment chamber.

The stern curtain of the containment chamber, the upper edge of which is positioned just under the water line, allows the fragments to spill over into a screen mesh basket which is mounted between the pontoons of the trailing weed disposal unit and abuts the stern curtain when the trailer is in position. The fragments are contained in the mesh basket while the supernatant water flows through the mesh into a removable tray where it is led back to the stern curtain cylinders for controlled release. The contained fragments remain in the basket until the main bulk of destroyed weeds in the vat above is dumped on shore. At this time, the fragment trap may be manually cleaned.

The main bulk of weeds and roots which have been lifted into the trailing vat are destroyed by the pumping of waste hot water from the engine manifold and from an exhaust pipe in line heat exchanger over them. A small auxiliary in line water heater may be added to provide the few extra calories needed to bring the hot waste water to the boiling point. This procedure quickly breaks down the weed fibres killing the weeds and roots and greatly reducing the bulk and the springiness of the collected weeds. This results in fewer stoppages for disposal, ensures that the collected spoil is dead, increases on line time, and eases problems associated with the handling of springy masses of raw weed spoil. The spoil so destroyed will be a pulpy mass which may then be easily slid to shore via a chute which is located behind and under the dumping vat.

The hydraulic backhoe frame module is constructed of structural steel I beam and channel, reinforced to withstand the torque of a light duty commercial backhoe unit. Wheels, axles and bearings are provided on the frame for trailerability of the disassembled system. The attached wheels also provide lift and rollers when the machine is fully assembled in order that the system may more easily pull itself into and out of the water.

Extending along the backhoe control arms from a high pressure water pump or from a manifold hinged to swing over the main propellor is a high pressure, high volume hose, terminated at the upper end of the backhoe bucket with a single high capacity nozzle or water vortex generator. This configuration allows the machine to thoroughly work around obstructions and in rocky areas where the use of the main working head module is precluded. The backhoe functions as a foot-leg combination which provides self propulsion for launching and beaching. It allows the machine to work in confined spaces where the physical size of the main heads cannot be used and it provides positive steering and thrust for the system when the main head is reversed for work along shore. It may also be used to clear away obstructions and trash on the lake bed.

All modules except the pontoon and peripheral hardware (cross members, walk ways) may be mounted on permanent wheels. When the system is dismantled, they may be towed by light vehicles. The wheels also function as rolling assists which extend slightly below the bottom of the pontoons when the system is fully assembled. This eases the problems other assemblies have when launching. The rollers also ease problems of assembly and ground handling of the machine and they make the costs of transporting a machine of this assembled size and nature much cheaper.

DESCRIPTION OF ACCOMPANYING DRAWINGS

The invention will now be described with reference to the accompanying drawings and wherein:

FIG. 1 illustrates in perspective view the aquatic weed cutter, de-rooter, and harvester, according to the present invention;

FIG. 2 illustrates in perspective view a portion of the apparatus as shown in FIG. 1, and wherein the cutting and de-rooting head assembly is shown in lowered position by means of extensible framing carried by one modular component of the apparatus;

FIG. 3 is a partially sectioned view of one of the water turbidity generators or vortex generators used in association with the cutting and de-rooting heads;

FIG. 4 is a sectional view through the cutting and de-rooting head taken along line 4—4 of FIG. 2 and showing scarifying means, and appears on the same sheet as FIG. 1;

FIG. 5 is a perspective view of the weed containment chamber as shown generally in FIG. 1, and which shows its relationship with the trailer module and showing the fragment trap and screen; and FIG. 6 is a rear perspective view of the containment chamber as shown in FIG. 5.

Specific reference will now be had to the accompanying drawings wherein like reference numerals refer to like parts.

The apparatus of the invention is of modular construction to greatly simplify the transport of the apparatus from one location to the other; and because of the modular construction the use of any large scale transportation vehicle is not required, and the completed assembly can be moved utilizing light duty vehicles.

The apparatus consists of flotation means in the form of elongated pontoons 2 which extend parallel to each other and which support the modular components which are described below. In FIG. 1, a walk and railing structure 4 is shown being positioned along the top of one of the pontoons, but this walk and railing structure has been omitted from the other pontoon to enable a more complete understanding.

The apparatus is intended for movement in the direction from right to left in FIG. 1, and the first modular component in the assembly in the direction of travel is a backhoe and power nozzle assembly which is indicated generally by numeral 6 in FIG. 1. This modular component is provided with framing members 8 which are adapted for removable securement to the pontoons 2 and the unit is provided with a backhoe assembly 10 and associated power water nozzle 12; and for ease of transportability, the modular component is preferably provided with road wheels such as 14. The backhoe assembly 10 is preferably powered hydraulically with pressurized fluid being provided from a central control cab, and water pressure for the operation of the power nozzle 12 may be from a separate pump.

The purpose of the backhoe is to remove from the path of travel of the apparatus movable objects such as boulders, and discarded debris, and also to work around immovable objects to remove weeds and roots growing therearound. Additionally, and as explained above, the backhoe may usefully be used as a foot to assist the assembly in pulling itself out of a body of water and the backhoe may also usually be used to assist in providing directional stability to the assembly during its traversing. The water nozzle assembly 12 is used to direct a stream of water around rocks and crevices to dislodge weed growth therefrom.

Any debris or small boulders or other material dislodged and moved by the backhoe may conveniently be placed on the assembly on a suitable screen assembly such as shown partially in FIG. 1 by numeral 16.

The second modular component in the assembly is a control and power component illustrated generally in FIG. 1 by numeral 18. This component also is provided with framing members 8 which are removably secured to the pontoons 2 and additionally is provided with road wheels 14 enabling the unit to move along a road possibly under its own power. The modular component 18 includes the control cabin and the various power sources necessary for the operation of the apparatus such as the necessary hydraulic and water pressure sources. The control and power module is also provided with a suitable propeller (not shown) to move the complete assembly along a weed-cutting traverse. The road wheels 14 may be driven either by power derived from the control module or alternatively, the module may simply be provided with a suitable trailer hitch whereby it can be moved along a road by a lightweight vehicle.

Also, and although not specifically shown in the drawings, the cab component is provided with suitable couplings wherein hydraulic hoses and water pressure hoses leading to other component modules of the assembly can be secured.

The modular component shown generally by numeral 20 is the cutting and de-rooting head assembly, which consists of a cutting and de-rooting head shown generally by numeral 22, and extensible framing shown generally by the numeral 24. This module is also carried by the pontoons 2 by means of suitable framing 8. The operation and function of the cutting and de-rooting head assembly will be discussed in more detail below with reference to FIG. 2.

Beneath the cutting head assembly and extending extensibly downwardly into the water and secured to the rearmost of the pontoons 2 is a containment chamber generally indicated in FIG. 1 by numeral 26. The containment chamber will be discussed in more detail in a following description with reference to attached FIGS. 5 and 6.

Following the containment chamber and secured thereto is a weed hopper module generally indicated by numeral 28. This modular component is supported by its own pontoons 30, and is provided with a beltless conveyor assembly 32, and a suitable hopper 34 to receive the weeds and fragments thereof which have been cut by the cutting and de-rooting head. The beltless conveyor 32 as shown in the drawings is of known form and may consist of lifting prongs 36 movable in slots along the conveyor to move weeds from the surface of the containment chamber 26 up into the weed hopper 34 where they are preferably sprayed with hot water from the control module to kill the weed growth and also to afford better packing of the weed with less resiliency so that they may be more easily handled. In FIG. 1, the hopper is shown as being manually rotatable to dump the weeds (as by handle 38) and this dumping may either be onto a slide or shute connecting the assembly to shore (if the cutting is being done a reasonable distance from the shore) or onto a trailing barge or the like.

FIG. 2 illustrates the cutting and de-rooting head modular component 20 and shows the extensible framing 24 in raised vertical or substantially vertical positioning to enable the positioning of the cutting head 22 at the desired depth with respect to the bed of the like or river. The framing 24 consists of a base member 40 to which is pivotally attached ( as at 42) a first framing member 44, and which is movable from a generally horizontal position as shown in FIG. 1 to a substantially vertical position as shown in FIG. 2 by means of hydraulic cylinders 46 pivotally connected to rods 48 as shown in FIG. 2.

Carried by the first framing member 44 is a second or intermediate framing member 50 which is slidably positioned within the first framing member to an extended position as shown in FIG. 2. FIG. 2 shows this extension as being accomplished by an extensible hydraulic cylinder 52 which is interconnected between the first and second extensible frame sections. This illustrated arrangement could be used, or the doubling-arrangement discussed earlier in this disclosure could be used in its place.

Similar to the arrangement of the first and second framing section, a third framing section 54 is interconnected to the second framing section 50 by means of an extensible cylinder arrangement 56. Hydraulic power for the cylinders 52 and 56 is obtained from the power module 18, and it will be appreciated that extension and retraction of the pistons in the cylinders will result in extension and retraction of the extensible frame assembly.

Pivotally secured to the lowermost end of the extensible frame assembly is the cutter and de-rooting head assembly 22. The cutting head assembly is pivotally secured to the framing section 54 by means of a bracket arrangement 58, which enables the head 22 to assume any positioning with respect to the bed of the lake or river so that the head may follow the contours of the river or lake bottom regardless as to whether the apparatus is heading to or from shore or longitudinally of the shore line. Bracket 58 is pivotally secured to the cutter head by suitable means such as pivot pin 60 and is secured to the lowermost end of the third framing member 54 by means of a suitable pivot such as 62. The two pivot arrangements enable articulation of the cutter head in any desired manner with respect to the extensible framing as will be appreciated. The forward angle of pitch or inclination of the cutting head is controlled by hydraulic cylinders 64 which interconnect the cutting head with the bracket. Tilting of the cutting head transversely of its length is monitored by skids 66 which are positioned at the extreme ends of the cutting head as clearly shown in FIG. 2. One of the skids is shown in detail in FIG. 2. The cutting head 22 is lowered by the extensible frame assembly 20 until the skids 66 contact and rest against the bottom of the river or lake bed. The support for the skids is preferably in the form of a telescoping arrangement so that there is some resilient play between the skids and the framing of the cutting head. The skid arrangement consists of a bracket 68 for securement to the frame of the cutting head and a leg 70 which is movable vertically with respect to the bracket. A helical spring 72 is disposed between the bracket and the skid whereby an amount of resilient movement is possible between the skid and the bracket. Mounted on the bracket is a head pressure sensor 74 which "reads" the positioning of the leg and sends a signal to the operator so that the operator will then know the exact degree of pressure which is being exerted downwardly on the skid. A limit switch 76 may also be provided on the leg and between these two sensors the operator is able to positively determine whether or not the skid is in contact with the bottom of the lake bed and if it is, the exact amount of pressure which is being exerted on the skid by the extensible framing sections.

The skid assembly may also be provided with an error angle rheostat assembly 78 which tells the operator the degree of inclination or orientation of the skid so that corrections of head inclination with respect to the skids can be made during traversing to follow the contours of the lake bed.

At the leading edge of the cutter head is a blade or mower assembly 80, which may be of known agricultural variety having reciprocating knife blades to effect severing of the weed stalks. The knife blade may be provided with suitable guards (not shown) in the manner of a hay mower to prevent inadvertent damage to the blade through contact with underwater obstacles.

At the back of the cutting head are arranged a number of vortex water pressure generators 82 which are shown partially in section in FIG. 3. The generators 82 are of generally cylindrical outer configuration having a tapering inner conical bore 84 and a high pressure water inlet 86 is provided in the bore in the manner as shown in FIG. 3 wherein water under high pressure is introduced into the bore tangentially to the conical tapering core to impart a circular flow to the water in the form of a vortex as shown in helical line 88 in FIG. 2. The introduction of high pressure water into the vortex generators induces an additional flow of water into the generator through the open forwarding projecting end 90 and the water pressure issuing rearwardly from the generator is of a whirling turbid nature which scatters and disrupts the sand and mud at the bottom of the lake bed and effects the removal of deep weed roots.

Water under high pressure from the control and power module or from a separate water pump is led to the vortex generators by suitable conduits or piping such as 92 as shown in FIG. 2.

The de-rooting of these aqueous weeds prevents immediate re-growth of the weeds and the removal of weed roots is of course an absolute necessity if early re-growth of weeds is to be prevented.

The combination of the cutting bar assembly 80 and the scrubbing creating vortex generators 82 will remove the weed growth and scavenge the bed of the lake to expose the roots and to wash the roots free so that they can be collected for disposal. However, for a possibly more efficient and complete cleaning of the lake bed it is preferred that a scarifier assembly be positioned between the cutting blades and the vortex generators. In this regard, a suitable assembly is shown in cross-section in FIG. 4, which is a sectional view taken along line 4—4 in FIG. 2. The cutting head assembly 22 consists of framing 94 which is attached to the extensible rack assembly 24 in a manner as discussed above with reference to FIG. 2. Preferably, the frame 94 of the cutting head is provided with buoyancy chambers 96 which can be partially or completely filled with air or water to provide a positive or negative buoyancy effect to assist the positioning of the cutter head in a proper alignment with respect to the lake bed. Compressed air tubing for blowing water from the chambers 96 is not shown in FIG. 4, but such an arrangement will readily be apparent. One embodiment of a suitable scarifying arrangement is shown in FIG. 4 as consisting of a number of scarifying heads 98 which carry downwardly directed tines 100 which work through the soil on the lake bed much in the same fashion as agricultural drag harrows. However, in the embodiment shown in FIG. 4, the heads are carried by a common drive rod 107 which is reciprocably movable in the direction shown in the arrow and which is transverse to the direction of travel of the cutting heads. The reciprocating motion to the drive rod may be imparted through a mechanical crank arrangement 104 as shown in FIG. 4, or may otherwise be hydraulically driven in any suitable manner. Preferably, each scarifying head is mounted for some resilient vertical movement, and a spring 106 is positioned between the heads 98 and the common drive rod 107 as shown to enable some individual vertical movement of the scarifying heads as they are pulled along the river bottom. The forward motion of the cutting head and the transverse reciprocating movement of the scarifying tines 100 loosens the soil and exposes and frees the weed roots which are then caught in the turbidity created by the vortex generator and float or are propelled by the generator action to the surface of the water in the containment chamber where they are collected. The arrangement shown in FIG. 4 is only one of a number of scarifying assemblies which could be utilized, and a rotatable shaft carrying tines which rake the river bottom to free the weed roots could alternatively be used, as could any manner of harrow arrangements used in agriculture.

The cutting head operates within a containment chamber 26 which is partially shown in FIG. 1, and is shown in more detail in FIGS. 5 and 6.

The containment chamber is constructed in accordion-pleat fashion whereby it automatically will follow the depth and contour of the river bed during movement of the weed cutting assembly. As discussed earlier, the top framing 108 for the containment chamber is adapted for removable securement to the rear of the main pontoons 2 (not shown in FIG. 5) and is provided with downwardly extending side 110 and rear 112 curtains which may be of slotted canvas construction, and extensible vertically to follow the contours of the river bed. The lower edges of the side curtains 110 are provided with suitable running skids 114 for dragging movement along the edge of a river or lake. In order to provide a stiff leading edge to the side curtains during their various extensions and to prevent the bunching of the curtain slats during retraction and to eliminate fouling of the working heads by the curtains, strands 116 of elastic cord with a minimum stretch ratio of for example, slightly more than 3:1 are installed through holes or eyelets on the inside and outside of the leading edges of the accordion-pleats. Alternative arrangements using cable or rope terminating in elastic cords or springs may be used if desired.

The rear curtain assembly 112 is provided with a number of vertical openings 118 which are covered with mesh material such as nylon or the like which permits the flow of water therethrough, but traps weeds and weed particles. In preferred construction, the rear curtain is provided on its trailing side with semi-circular channels 120 over these mesh openings for purposes which will be described more fully with reference to FIG. 6.

The front of the containment chamber may be open as shown in FIG. 1, as desired when working in shallow water. However, the front may be fitted with suitable curtains to ensure entrapment of the weeds within the chamber. When using the weed cutting assembly in areas of rampant weed growth, a front upper curtain 122 will preferably be positioned across the upper front of the front opening as shown in FIG. 5. This curtain may also be of accordion pleat construction (not specifically shown) and is provided with one or more vertical mesh openings 124 as shown to govern the flow of water therethrough during movement of the assembly. The rear of the front upper curtain 122 may be provided with suitable flaps 126 which will close when the pressure and turbidity of the water movement within the containment chamber exceeds the water pressure resulting from the forward movement of the apparatus. This will prevent excess water entering the container chamber to avoid possible overflow of weed fragments out through the top of the containment chamber assembly. When operating in areas of stubble or weed crowns which are of fairly small height, a half curtain similar to curtain 122 can be removably positioned on the lower front half of the container chamber to ensure that all of the weed fragments which are cut and scavenged will be entrapped.

The framing 108 of the containment chamber is provided on its rear upper surface with a notched section 128 to receive the leading portion of the beltless conveyor 32 so that weeds and weed fragments floating to the surface of the water in the containment chamber are then picked up and deposited in the weed carrying hopper 34.

FIG. 5 shows the trailer module 28 positioned immediately behind the container chamber framing and for purposes of clarity the beltless conveyor and the weed hopper have been omitted to specifically show a fragment screen 130 and water return tray 132. The water return tray 130 which is open-topped extends between the pontoons 30 of the trailer module and has forwardly directed pipes 34 which extend forwardly and downwardly and which are adapted to be received within the semi-circular vertical channels 120 provided on the rear side of the rear curtain 112 of the container chamber as shown in FIG. 6. Spaced above the open topped tank 132 is the fragment screen 130 which is under the weed hopper and which extends partially forwardly under the beltless conveyor. Thus, any weed fragments washing rearwardly through the notch 128 in the framing of the container chamber or dropping from the beltless conveyor 32 or dropping through the weed hopper 34 are caught by this screen and are prevented from escaping into the water behind the assembly. This fragment screen may be manually cleaned from time to time to remove the weed fragments which have accummulated thereon.

I claim:

1. An aquatic weed cutter, de-rooter and harvester of modular construction permitting ready disassembly into modular components for ease of transport, comprising flotation means, a weed cutter and de-rooting head assembly carried by extensible framing to permit selective positioning of the head assembly with respect to the bed of a body of water, and wherein the head assembly has weed severing means provided along its forward edge and vortex generators along its rearward edge, and a vertically extensible containment chamber at least partially surrounding the head assembly, at working depth, to contain severed weeds and weed fragments.

2. An aquatic weed cutter according to claim 1, including lake bed scarifying means carried by the head assembly between the weed severing means and the scrubbing generators.

3. An aquatic weed cutter according to claim 2, wherein the scarifying means include a plurality of lake or river bed contacting tines which are mounted for reciprocal movement transversely to the direction of travel of the head assembly.

4. An aquatic weed cutter according to claim 1, including lake bed contacting skids provided at the ends of the head assembly, the skids being spring-mounted and the mounting being provided with sensors whereby an operator may monitor and control the positioning of the head assembly with respect to the lake bed.

5. An aquatic weed cutter according to claim 1, wherein the head assembly includes buoyancy chambers whereby the degree of positive or negative buoyance can be regulated.

6. An aquatic weed cutter according to claim 1, including a control and power modular component, and a backhoe and water power nozzle modular component for dislodging debris and for removing weed growth from around immovable obstacles.

7. An aquatic weed cutter according to claim 1, including a trailer module for receiving cut weeds and weed fragments, and conveyor means for conveying weeds floating to the surface in the containment chamber to the trailer module.

8. An aquatic weed cutter according to claim 7, including means to spray hot water onto the weeds carried by the trailer module.

9. An aquatic weed cutter according to claim 7 including a hopper on the trailer module to receive cut weeds and weed fragments, and including a weed fragment trap beneath the hopper.

10. An aquatic weed cutter according to claim 1, wherein the containment chamber has side and rear walls of accordion-pleat construction, the lower edges of the side walls having skids to follow the contour of the lake or river bed.

11. A cutter according to claim 10, wherein the containment chamber is provided with removable curtains covering the front, one removable curtain covering the top half of the front and a further removable curtain covering the bottom half of the front.

* * * * *